United States Patent [19]
McGee

[11] 3,802,711
[45] Apr. 9, 1974

[54] SEGMENTAL SEALING RING ASSEMBLY

[75] Inventor: Richard P. McGee, Yeadon, Pa.

[73] Assignee: Gould Inc., Mendota Heights, Minn.

[22] Filed: Dec. 13, 1971

[21] Appl. No.: 207,382

[52] U.S. Cl. .................................. 277/193, 277/197
[51] Int. Cl. ....... F16j 15/00, F02f 5/00, K16k 41/00
[58] Field of Search .......... 277/138, 193, 192, 196, 277/197, 198, 143, 141, 139

[56] References Cited
UNITED STATES PATENTS

| | | | |
|---|---|---|---|
| 2,600,310 | 6/1952 | Marien | 277/143 X |
| 2,091,947 | 8/1937 | Cords | 277/196 X |
| 3,174,762 | 3/1965 | Hesling et al. | 277/193 |
| 3,456,953 | 7/1969 | Hutto | 277/143 |
| 1,958,313 | 5/1934 | Powell | 277/196 |
| 2,160,654 | 5/1939 | Hagen | 277/196 X |
| 2,073,500 | 3/1937 | Sopp | 277/197 |

*Primary Examiner*—Samuel B. Rothberg
*Attorney, Agent, or Firm*—Seidel, Gonda & Goldhammer

[57] ABSTRACT

A four-way seal is provided in the groove and opposed bearing surface of a piston-cylinder combination by means of a sealing assembly comprising a plurality of axially-superposed split-ring segments positioned in the groove. At least one of the split-ring segments has a radial bias which forces the outer edge of the ring out of the groove and against the opposed bearing surface. At least one of the other split-ring segments has an opposite radial bias which forces an opposite edge against the bottom of the groove. At least one segment also has an axial bias which forces two of the split-ring segments against opposite sides of the groove to complete the four-way seal.

11 Claims, 8 Drawing Figures

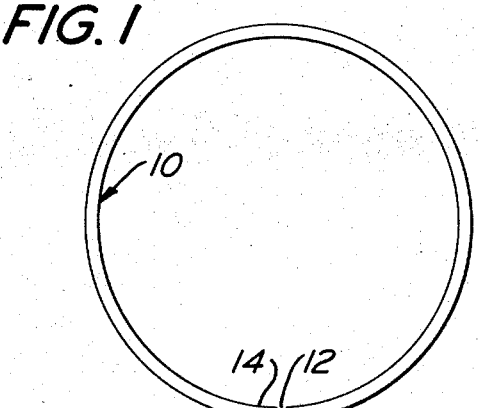
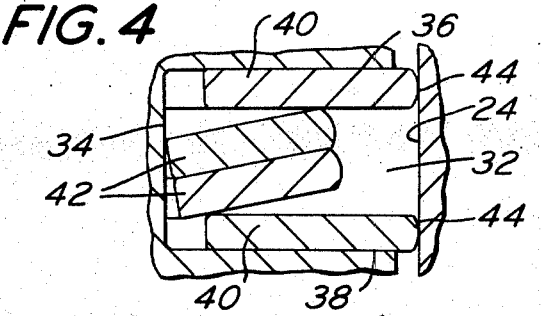
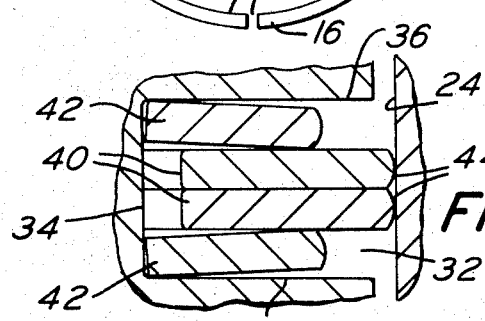
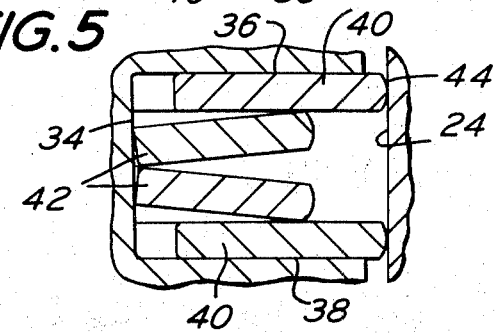
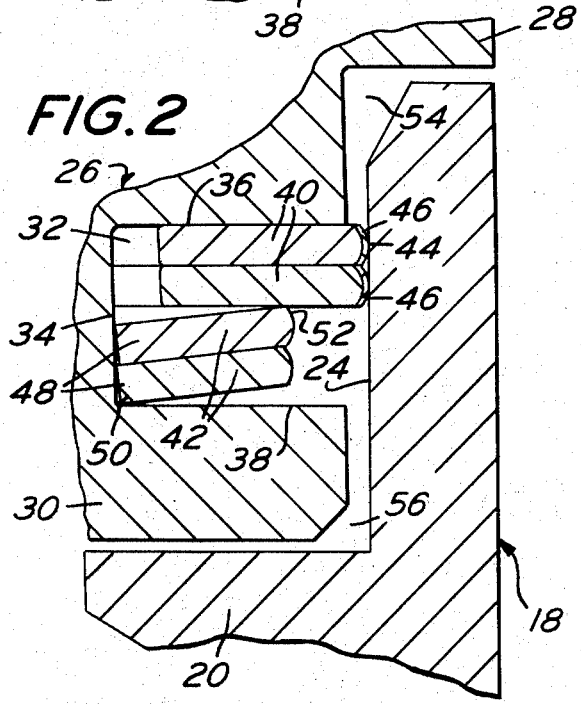
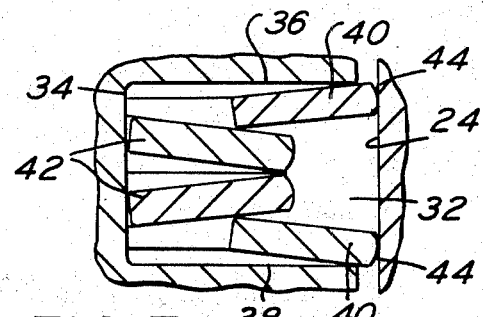
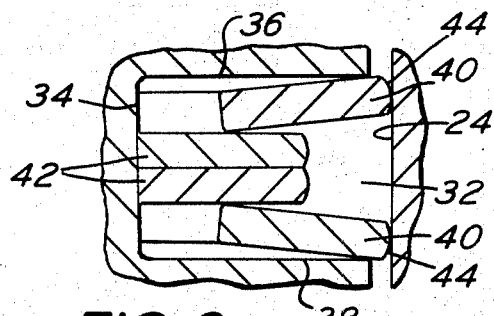
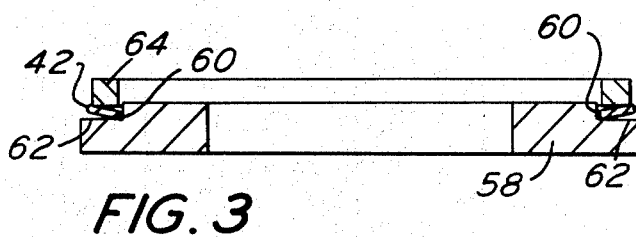
INVENTOR
RICHARD P. MC GEE
BY
Seidel, Gonda & Goldhammer
ATTORNEYS.

SEGMENTAL SEALING RING ASSEMBLY

The present invention relates to segmental sealing ring assemblies. More particularly, the present invention is directed to sealing assemblies comprising a plurality of split-ring segments capable of forming a four-way seal.

The use of split-ring segments for seals or packings between rotative or reciprocable parts is old and well known in several arts, including internal combustion engines and hydraulic pumps. Such split-rings, as shown for example in FIG. 1, are usually made of metal, such as steel or cast iron, and are tempered with an inherent radial bias, either inwardly or outwardly depending upon the particular application.

That is, when the split-ring segment is to be used in a groove located at the inner surface of a cylinder or sleeve, the ring will be provided with a radially inward bias so as to cause the ring to contract and form a seal against the outer periphery of a piston or shaft which moves within the cylinder or sleeve. On the other hand, if the split-ring segment is to be used in a groove located in the outer surface of a piston or shaft, the ring will be provided with a radially outward bias so as to cause the ring to expand out of the groove to form a seal with the inner surface of the cylinder or sleeve in which the piston or shaft moves. To provide these radial biases, expanding rings in their free state will have large splits or gaps, while contracting rings will have their split ends overlapping in their free state. In this manner, the split or gap in the rings, when in operation, will be as small as possible.

In the past, many modifications of these basic splitring sealing assemblies have been made. Many such assemblies include additional elements, such as metal expanders or polymeric O-rings to aid the inherent radial biases of the split-rings and provide additional sealing in some cases. However, while such prior art assemblies provide varying degrees of sealing against the bearing surface which lies opposite the groove opening, most assemblies fail to provide adequate seals at the sides and bottom of the groove. This may permit the leakage of oil or the escape of combustion gases which the seal is desired to prevent.

One such assembly which attempts to provide a seal around the whole groove is illustrated in U.S. Pat. No. 3,420,536. This patent uses a combination of ring segments at least one of which is biased inwardly and at least one of which is biased outwardly. However, the assembly shown in this patent requires the additional use of elastomeric O-rings to supplement the bias and provide an axial seal against the side walls of the groove.

Another older assembly which attempts to provide both radial and axial seals is illustrated in U.S. Pat. No. 1,745,154. However, the assembly of this patent uses two sets of metal expander rings, one of which provides an axial bias and one of which provides a radial bias. It would clearly be much preferable if both axial and radial seals could be provided without the necessity of using additional elements such as elastomeric O-rings or metal expanders.

Accordingly, it is an object of the present invention to provide an improved sealing assembly which will provide a four-way seal in split-ring grooves between rotative or reciprocable parts.

It is a further object of the present invention to provide an improved ring in groove sealing assembly which produces a four-way seal without the use of additional metal expanders or elastomeric O-rings.

It is a still further object of the present invention to provide an improved ring in groove sealing assembly in which a plurality of split-ring segments produce both axial and radial seals in the groove.

It is another object of the present invention to provide an improved sealing assembly which can be beneficial in emission control work in internal combustion engines due to a four-way seal in the piston groove.

Other objects will appear hereinafter.

The above and other objects are achieved by the sealing assembly of the present invention which comprises a plurality of axially-superposed split-ring segments positioned in a radial groove which has an opposed bearing surface, at least one first segment having a radial bias tending to force a peripheral edge of the first segment out of the groove and against the opposed bearing surface, at least one second segment having a radial bias opposite to that of the first segment so as to force the opposite peripheral edge of the second segment against the bottom of the groove, at least one segment also having an axial bias tending to force two of the split-ring segments against opposite sides of the groove. The axial bias of any segment must not be so strong as to substantially interfere with the action of the radial bias of any other segment.

For the purpose of illustrating the invention, there are shown in the drawings forms which are presently preferred; it being understood, however, that this invention is not limited to the precise arrangements and instrumentalities shown.

FIG. 1 is a plan view of a split-ring segment of the type used in the present invention;

FIG. 2 is a partially broken away sectional view through a piston of a cross-head piston assembly, having installed therein a sealing assembly according to one embodiment of the present invention;

FIG. 3 is a sectional view showing an arrangement for determining the axial bias of a contracting ring segment according to the present invention;

FIGS. 4, 5, 6, 7 and 8 are further broken away sectional views similar to FIG. 2, showing further embodiments of the present invention.

Referring now to the drawings in detail, wherein like numerals indicate like elements, there is shown in FIG. 1 a split-ring segment or rail of the type used in the present invention and designated generally as 10. Both expanding and contracting ring segments according to the present invention, when installed, will have a small circumferential gap 12 formed between the two split ends 14 and 16. In the installed state, the gap 12 should be as small as possible and will generally be on the order of 20 to 30 mils plus or minus normal manufacturing tolerances.

The split ring segments are annular having inner and outer peripheral edges with upper and lower substantially flat side surfaces extending between their inner and outer edges. The split ring segments are preferably made of steel, but may be suitably made of any material which will retain an inherent bias when deformed from the free state. Other suitable materials include cast or tempered iron and other metals commonly used for split-rings. In addition, surfaces of the rings which will scrape against a bearing surface may be chrome plated or coated with some other wear resistant substance.

Referring now to FIG. 2, there is shown a preferred embodiment of a sealing assembly according to the present invention installed in a cross-head piston of an internal combustion engine, such as a diesel engine. The partially broken away section shows a portion of the upper skirt portion 18 of the piston having an inwardly projecting flange 20 and an inner ring bearing surface 24. Also shown is a portion of the crown 26 of a cross-head piston comprising a main upper portion 28 and a downwardly projecting flange 30 having a groove 32 for holding a plurality of split-rings. The groove is defined by a bottom wall 34 and side walls 36 and 38.

A sealing assembly which is disposed within groove 32 comprises a plurality of superposed split-ring segments. While the total number of segments disposed in the groove 32 is not critical, it is essential that there be at least one expanding segment 40 and at least one contracting segment 42. Each of the embodiments shown in the figures of the present invention illustrates the use of four split-ring segments, two being expanding rails 40 and two being contracting rails 42. However, it will be understood by one of ordinary skill in the art that almost any other number could be used, and the total number of segments or rails will normally depend upon the total width of the groove and the total axial thickness of each segment.

Expanding segments 40 are provided with an outward bias by constructing each split-ring segment in such a manner that in its free state, the outer diameter of the ring 40 will be slightly greater than the inside diameter of bearing surface 24. Since it will then require a certain positive pressure or tension to close the ring 40 to the specified diameter so that it will fit within the skirt portion, the ring 40 will necessarily have an inherent outward bias when installed, thus tending to force the peripheral edge 44 of each segment 40 against the inside bearing surface 24 of skirt portion 18. This will form a seal to prevent passage of liquids and/or gases between the peripheral edges 44 of rings 40 and the inside surface 24 of the skirt portion of the piston.

The efficiency of the seal will of course depend to some extent on the expanding force of the segments 40. In low pressure sealing applications, such as between the crown and skirt portions of a cross-head piston, an expanding tension of as little as one pound may be required. That is, a minimum tension of one pound applied to opposite peripheral edges of the split-ring 90 degrees removed from the gap, may be required to close the ring from its free state to the diameter necessary for insertion within the skirt portion.

In order to increase wear resistance of the expanding segments 40, it may be desired to apply chrome plating 46 to the outside diameter of segments 40, as shown in FIG. 2. Subsequent to chrome plating, the outside diameter of the ring must be 100 percent light tight with respect to the bearing surface 24, and it is preferred that the outside edge before lapping have a full radius. The 100 percent light tightness may be achieved by applying lapping compound to the plated edges or by other conventional techniques. A minimum chrome plating of about 2 mils thickness is preferred.

The contracting segments 42 are provided with an inherent inward bias by forming the rings in such a manner that in the free state the split ends 14 and 16 overlap. Where a gap 12 in the installed state is desired to be on the order of about 25 to 50 mils, the minimum overlap of the split ends 14 and 16 in the free state should be about one sixteenth inch in order to provide the desired inherent inward bias. When installed, the inherent inward bias of segments 42 will cause the inner peripheral edges 48 of rings 42 to contract against the bottom wall 34 of groove 32. This will cause a seal to prevent the passage of liquids and/or gases between the edges 48 and the bottom wall 34.

Contracting segments 42 are also provided with an inherent axial bias by forming the rings with a dish or concavity in their free state. When installed, segments 42 will be slightly compressed so that the degree of dish or concavity will be reduced. As a result of the tendency of the segments 42 to return to the full dish or concavity in their free state, an axial bias or force will be exerted.

As shown in FIG. 2, the axial bias of segments 42 forces the lower inner corner 50 of lower ring 42 against groove wall 38 and forces the upper outer corner 52 of the upper ring 42 against the lower expanding ring 40. Thus, a seal is formed between lower inner corner 50 and side wall 38, and another seal is formed between the upper surface of top expanding ring 40 and groove wall 36. This completes the four-way seal around the groove 32 and prevents liquids or gases from passing between cavities 54 and 56 formed by the crown and skirt portions of the cross-head piston.

A fifth seal may be formed with the sealing assembly of the present invention by staggering or circumferentially displacing the gap 12 of each split-ring segment with respect to each other in a manner which is well-known in the art for plural split-ring assemblies. Thus, where four rings are used, the gaps may be positioned 90° apart, thus further impeding the flow of liquids or gases passed the sealing ring assembly.

The degree of axial bias of dished segments will now be described with particular reference to FIG. 3. In FIG. 3 is shown a contracting ring 42 mounted on a circular pedestal 58 having a shoulder 60 whose diameter corresponds to the bottom 34 of groove 32 in which the contracting segment is to be mouted. The pedestal 58 also has a shelf 62 which corresponds to side wall 38 of groove 32. A load ring 64 is positioned on top of segment 42.

The only essential requirement of the axial bias of axially biased segments is that the bias be sufficient to produce effective seals between side walls 36 and 38 of groove 32 and the split-ring segments adjacent to these walls, while still being insufficient to interfere with the action of the radial bias of the other segments. In one specific example which has been tried a suitable axial bias of contracting segment 42 has been defined with respect to the arrangement of FIG. 3 as follows: Where the axial thickness of contracting segment 42 is approximately 24 mils, a load of 20 to 24 pounds applied vertically to the top of load ring 64 is required to compress segment 42 so that the distance between the bottom edge of load ring 64 and shelf 62 is reduced from 45 mils (contracting segment in its free state) to 31 mils (compressed). The above is of course only exemplary, and the degree of dish or concavity for axially biased segments in any particular installation will be readily determined by one of ordinary skill in the art, keeping in mind that the inherent radial bias of the other segments must not be substantially interferred with.

Referring now to FIGS. 4–8, which illustrate several alternative embodiments of the present invention, the chrome plating has been omitted from the outside diameter of expanding segments 40 in each embodiment. However, it will be understood that chrome plating may be used where desired in any of these embodiments. FIG. 4 shows another embodiment where the two contracting segments 42 are adjacently superposed, but are positioned between the two expanding segments 40. In this embodiment the axial bias of the contracting rings 42 acts against the two expanding rails so that large seals are formed between side walls 36 and 38 of groove 32 and the adjacent faces of the expanding rails.

FIG. 5 shows a further embodiment wherein the contracting segments 42 are again adjacently superposed and positioned between the expanding segments 40, but the lower contracting segment is reversed so that the dishes of the two contracting segments are substantially opposite. This forms a spring-like effect which again causes seals to be formed between side walls 36 and 38 of groove 32 and the flat faces of the adjacent expanding rails 40.

FIG. 6 shows still another embodiment of the present invention where the two expanding segments 40 are adjacently superposed and positioned between the two oppositely dished contracting rails 42. In this embodiment the seals with side walls 36 and 38 of groove 32 are formed with the inside corners of contracting segments 42.

FIGS. 7 and 8 illustrate embodiments of the present invention in which the expanding segments 40 are provided with an axial bias as indicated by the dish in these segments. In FIG. 7 both expanding segments 40 and contracting segments 42 are provided with an axial bias, with each segment having a dish or concavity opposite to that of the next adjacent segment.

In FIG. 8 the contracting segments 42 are adjacently superposed and have no axial bias, while the expanding segments 40 are provided with opposite dishes or concavities. In both FIGS. 7 and 8 seals are provided at the lips of side walls 36 and 38 with the respective faces of expanding rails 40.

The alternative embodiments illustrated in FIGS. 4-8 are not intended to be exhaustive, and a multitude of other arrangements of segments are contemplated within the scope of the present invention, and which will be obvious to one of ordinary skill in the art from the teachings of the present invention.

While the present invention has been described with particular reference to embodiments comprising four segments, two being expanding and two being contracting segments, it will be understood by one of ordinary skill in the art that almost any number of segments may be used depending upon the total width of the groove. In the particular embodiment of FIG. 2, the expanding rails have an axial thickness of about 30 mils each, the contracting rails have an axial thickness of about 24 mils, and the total groove width was about one-eighth inch.

Furthermore, the radial thickness of each split-ring segment may also vary depending upon the particular application. However, the contracting rail should have a sufficient radial thickness to eliminate any chance of the inside diameter of the expanding rails becoming hung up on the outside diameter of the contracting segments. In the same specific embodiment referred to above, the expanding rails had a radial thickness of about 150 mils, the contracting rails had a radial thickness of about 160 mils, and the groove had a radial depth of about 165 mils. It will be appreciated that the drawings of the present application are not drawn to scale and that sizes, angles and clearances have been exaggerated for ease of illustration.

It will of course be evident that the diameters of the rings will depend upon the dimensions of the piston system in which they are installed. It will also be understood that the rings, where appropriate, could be installed in a groove in a cylinder or sleeve wall, instead of in a groove in a piston or shaft wall.

Finally, while the sealing assemblies of the present invention have particular utility in low pressure installations, it should be understood that the use of such sealing assemblies is not limited to cross-head pistons in internal combustion engines, or even to internal combustion engines alone. The present invention has particular utility in emission control work, but it is contemplated that it may be adapted to higher pressure applications with suitable modifications which will be evident to one of ordinary skill in the art.

The present invention may be embodied in other specific forms without departing from the spirit or essential attributes thereof and, accordingly, reference should be made to the appended claims, rather than to the foregoing specification as indicating the scope of the invention.

I claim:

1. A sealing assembly comprising a circumferential groove, a bearing surface opposite said groove, and a plurality of split ring segments positioned in said groove, each of said split ring segments comprising an annulus having inner and outer peripheral edges and upper and lower substantially flat side surfaces extending between their inner and outer peripheral edges, each of said split ring segments being adjacent to and in touching relation to another of said segments, at least one first segment being inherently biased radially outwardly to force its outer peripheral edge out of said groove and against said bearing surface to form a first seal, at least one second segment being inherently biased radially inwardly to force its inner peripheral edge against the bottom of said groove to form a second seal, at least one of said segments being normally dish shaped in its free state and being slightly compressed in said groove to reduce said dish shape, and said normally dish shaped segment creating an axial bias urging two of said segments against opposite sides of said groove to form third and fourth seals while maintaining said adjacent segments in touching relation to each other, and said axial bias being insufficient to substantially interfere with said first and second seals so that a low pressure seal is formed.

2. A sealing assembly according to claim 1 wherein said split-ring segments are made of steel.

3. A sealing assembly according to claim 1 wherein said groove is located in the crown portion of a cross-head piston.

4. A sealing assembly comprising a circumferential groove, a bearing surface opposite said groove and a plurality of axially-superposed split-ring segments positioned in said groove, at least one first segment having a radial bias so as to force a peripheral edge of said first segment out of said groove and against said bearing surface, at least one second segment having a radial bias opposite to that of said first segment so as to force the opposite peripheral edge of said second segment against the bottom of said groove, at least one of said segments also having an axial bias so as to force said split-ring segments against opposite sides of said groove, said axial bias being insufficient to substantially interfere with the action of the radial bias of the other segments, and adjacently superposed split-ring segments having their gaps circumferentially displaced from one another.

5. A sealing assembly comprising a circumferential groove, a bearing surface opposite said groove, and a plurality of axially-superposed split-ring segments, said segments comprising at least two groups of segments, each of said groups comprising at least two segments, at least two of said segments in one of said groups having a radial bias so as to force peripheral edges of said segments out of said groove and against said bearing surface, at least two of said segments in another one of said groups having a radial bias opposite to that of said segments in said one group to force the opposite peripheral edges of said second segments against the bottom of said groove, and the segments in at least one of said groups are normally dish shaped in their free state and being slightly compressed in said groove to reduce said dish shape to cause an axial bias urging some of said segments against the sides of said groove, and said axial bias being insufficient to substantially interfere with the action of said radial bias of said other segments.

6. A sealing assembly according to claim 5 wherein said dish shaped segments have substantially the same dish.

7. A sealing assembly according to claim 5 wherein said dish shaped segments have substantially opposite dishes.

8. A sealing assembly according to claim 6 wherein said dish shaped segments are adjacently superposed and said other segments are adjacently superposed.

9. A sealing assembly according to claim 6 wherein said dish shaped segments are adjacently superposed and positioned between two of said other segments.

10. A sealing assembly according to claim 7 wherein said dish shaped segments are adjacently superposed and positioned between two of said other segments.

11. A sealing assembly according to claim 7 wherein said other segments are adjacently superposed and positioned between two of said dish shaped segments.

* * * * *